(12) United States Patent
Yoon et al.

(10) Patent No.: US 6,757,620 B1
(45) Date of Patent: Jun. 29, 2004

(54) METHOD FOR EXAMINING STRUCTURES HAVING HIGH NATURAL VIBRATION FREQUENCY USING ALTERNATING MANUAL VIBRATION-EXCITING METHOD

(75) Inventors: Sung Won Yoon, Seoul (KR); Sang Keun Oh, Seoul (KR)

(73) Assignee: Seoul National University of Technology (KR)

( * ) Notice: Subject to any disclaimer, the term of this patent is extended or adjusted under 35 U.S.C. 154(b) by 0 days.

(21) Appl. No.: 10/313,752

(22) Filed: Dec. 5, 2002

(51) Int. Cl.[7] .............................. G01B 3/00; G01B 5/00
(52) U.S. Cl. ........................................................ 702/33
(58) Field of Search ........................ 702/33, 56; 73/662, 73/663, 579, 594, 786

(56) References Cited

U.S. PATENT DOCUMENTS 5,737,239 A * 4/1998 Horiuchi et al. .............. 702/56
6,341,258 B1   1/2002 Inoue et al.

OTHER PUBLICATIONS

English Translation of Yoon et al., The Evaluation of Vibrations Characteristic for Low–Rise Reinforced Concrete Buildings Based on Free Vibration Test, Apr. 27, 2002.*

Yoon et al., The Evaluation of Vibrations Characteristic for Low–Rise Reinforced Concrete Buildings Based on Free Vibration Test, Apr. 27, 2002.

* cited by examiner

Primary Examiner—Michael Nghiem
(74) Attorney, Agent, or Firm—Akerman Senterfitt

(57) ABSTRACT

An alternating human vibration-exciting method for obtaining a free vibration waveform of buildings or civil structures having a natural vibration frequency more than 2–5 Hz. First and second same-number set of subjects having similar weights alternately apply exciting forces to a wall on a top of the structure. An electronic beat-sound generator is adjusted to a two-beat mode to generate two alternating beat sounds repeatedly so that the first and second sets can apply vibration exciting forces repeatedly at a frequency of half of the natural vibration frequency of the structure obtained by micro-tremor measurement, while alternately synchronizing their actions to the two alternating beat sounds, respectively. The vibration exciting action is stopped after the structure is brought to a sufficient resonance state, thereby obtaining a free vibration waveform.

1 Claim, 4 Drawing Sheets

FIG. 5

| Test Structure | Number of stories | Natural Vibration frequency in the short direction(Hz) | Damping ratio in the short direction(%) |
|---|---|---|---|
| Social Education Center in Seoul National University of Technology | 3 Stories | 4.10 | 1.46 |

METHOD FOR EXAMINING STRUCTURES HAVING HIGH NATURAL VIBRATION FREQUENCY USING ALTERNATING MANUAL VIBRATION-EXCITING METHOD

BACKGROUND OF THE INVENTION

1. Field of the Invention

The present invention relates to a free-vibration test method for examining building and civil structures having a natural vibration frequency more than 2.5 Hz using alternating human vibration-exciting method, and more particularly to a method for examining buildings and civil structures, wherein two sets of human subjects alternately act together to induce vibration in the structure, while synchronizing their actions to alternating-beat sounds generated from an electronic beat-sound generator such as a metronome, thereby causing the resonance of the structure, and thereafter the action is brought to a stop for obtaining a correct free-vibration waveform of the structure, thereby estimating a damping ratio of the structure.

2. Description of the Related Art

Due to vibrations caused by traffic, installed equipments, and construction works, even low-rise reinforced concrete structures are inevitably subject to a vibration problem that affects the serviceability of the structure.

In connection with a horizontal vibration, it is essential to correctly estimate the vibration characteristics of the structure, such as natural vibration frequency and damping ratio, to determine the serviceability of the structure.

That is, when examining the serviceability of a building, it is very important to measure the natural vibration frequency and the damping ratio of the structure. The natural vibration frequency is a very important variable for calculating the response acceleration of the structure by a related structure standard or a wind tunnel test. The response acceleration decreases in proportion to the increase of the natural vibration frequency. On the other hand, the damping ratio can be obtained only via measurement.

There are a number of vibration exciting methods that must be performed in advance for obtaining the damping ratio. In the methods, a force is repeatedly applied to a structure at a frequency corresponding to its natural period, whereby the response amplitude of the structure is increased in accordance with a resonance phenomenon. In one of such vibration exciting methods, human subjects are used as means for exciting the resonant vibration, which is called a human vibration-exciting test method.

In the human vibration-exciting test method, the vibration exciting actions are stopped at a time when the vibration amplitude reaches a sufficient value, and the subsequent free vibration of the structure is measured. In order to obtain an amplitude of more than a micro-tremor level, it is necessary to match the repeated period of the vibration exciting action as accurately as possible to the natural period of the structure, and also to provide a sufficient number of repeating times of the vibration excitation action.

In such a vibration excitation test method, the inertial force obtained by a movement of the weight of the human subjects is used as means for pushing the structure, with no need to prepare a special machine, thereby making it easy to perform the vibration test even just before the completion of the construction.

In more detail, in the human vibration-exciting test method, the free vibration waveform of a structure is obtained in such a way that, as shown in FIG. 1, human subjects, usually two to three, or, up to twenty if needed, act together to repeatedly apply a vibration exciting force on a wall in a top floor of the structure at a frequency corresponding to the natural vibration frequency of the structure, and stop the actions at a predetermined later time. However, only when the structure has a natural frequency in the range of 0.5 to 2.5 Hz can the human subjects repeatedly apply a sufficient vibration-exciting force at a frequency in the same range. That is, such a human vibration-exciting method is not effective in obtaining the free vibration waveform in the case of the natural frequency more than 2.5 Hz, because it is difficult for the human subjects to actually exert a sufficient vibration-exciting force 2.5 times per second.

Generally, the damping ratio (Y) is estimated using a logarithmic decrement method, which is expressed by an equation, $Y = \frac{1}{2\pi} \ln(X_1/X_{1+2}) \times 100$, and illustrated by a graph showing the free vibration waveform in FIG. 2, where X and Y axes represent time and acceleration, respectively. The amplitude of the acceleration is 2 m/s$^2$ at maximum, and gradually reduced as time goes on, where $X_1$ represents the sum of positive amplitude of the first waveform and the absolute value of a negative amplitude of the second waveform.

That is, $X_1$ represents the sum of a positive amplitude of an $i^{th}$ peak and the absolute value of a negative amplitude of an $(i+1)^{th}$ peak. The reason why the logarithmic decrement method is obtained using the positive amplitude in such a manner is that it is difficult to perform zero adjustment accurately in a general vibration measurement.

Meanwhile, the free vibration test can be performed using a vibration-exciting device in the prior art. However, this device is large in scale and requires space and labor to install it.

In addition, most vibration-exciting devices are expensive and complicated in terms of configuration, and are heavy so that it is very difficult to carry them to a top floor of the structure. Further, while the device excites a vibration, the rotation frequency of a weight of the device increases or decreases with time. Therefore, it is difficult to excite the vibration at a constant frequency. Furthermore, even after power is turned off to stop the vibration excitation, the weight of the device continues its rotation once or twice more, affecting the free vibration waveform.

On the other hand, the free vibration waveform can be obtained through micro-tremor measurement, but this approach requires an enormous amount of measurement data collected for several days. In addition, the micro-tremor has a low vibration amplitude. Therefore, in consideration of the characteristics of the damping ratio such that the damping ratio increases as the vibration amplitude increases, it is difficult to obtain a valid damping ratio in terms of the serviceability of the structure.

FIG. 3 is a view illustrating a tensioned steel-wire cutting method, a kind of vibration exciting method. In this method, both ends of a steel wire 11 are fixed to the ground and the top of a structure 10, and, after the steel wire is tensioned, the steel wire 11 is cut to induce a free vibration of the structure 10. However, it is difficult to apply this method to an actual structure, because it needs a sufficient space around the structure.

SUMMARY OF THE INVENTION

Therefore, the present invention has been made in view of the above problems, and it is an object of the present invention to provide a method for examining structures having high natural vibration frequency using alternating human vibration-excitation, wherein the free vibration waveform of a building or civil structure having a natural vibration frequency more than 2.5 Hz, which corresponds to the upper limit of the range of frequencies at which a human vibration excitation is effective in the prior art, is obtained in such a manner that two sets of human subjects alternately and repeatedly exert a vibration exciting force on the structure at a frequency corresponding to half of the natural vibration frequency of the structure, so as to induce its vibration.

In accordance with the present invention, the above and other objects can be accomplished by the provision of an alternating human vibration-exciting method for obtaining a free vibration waveform of buildings or civil structure having a natural vibration frequency more than 2.5 Hz, wherein the free vibration waveform is obtained in such a manner that (a) first and second same-number sets of subjects having weights similar to each other alternately apply exciting forces to a wall on a top of the structure, (b) an electronic beat-sound generator is adjusted to a two-beat node to repeatedly generate two alternating beat sounds so that the first and second sets of human subjects can apply vibration exciting forces repeatedly at a frequency corresponding to half of the natural vibration frequency of the structure obtained by micro-tremor measurement, while alternately synchronizing their actions to the two alternating beat sounds, respectively, and (c) the vibration exciting action is stopped after the structure is brought to a sufficient resonance state, thereby obtaining a free vibration waveform.

BRIEF DESCRIPTION OF THE DRAWINGS

The above and other objects, features and other advantages of the present invent ion will be more clearly understood from the following detai led description taken in conjunction with the accompanying drawings, in which:

FIG. 5 is a table of a damping ratio calculated based on the alternating human vibration exciting method;

DESCRIPTION OF THE PREFERRED EMBODIMENTS

Figure 1:
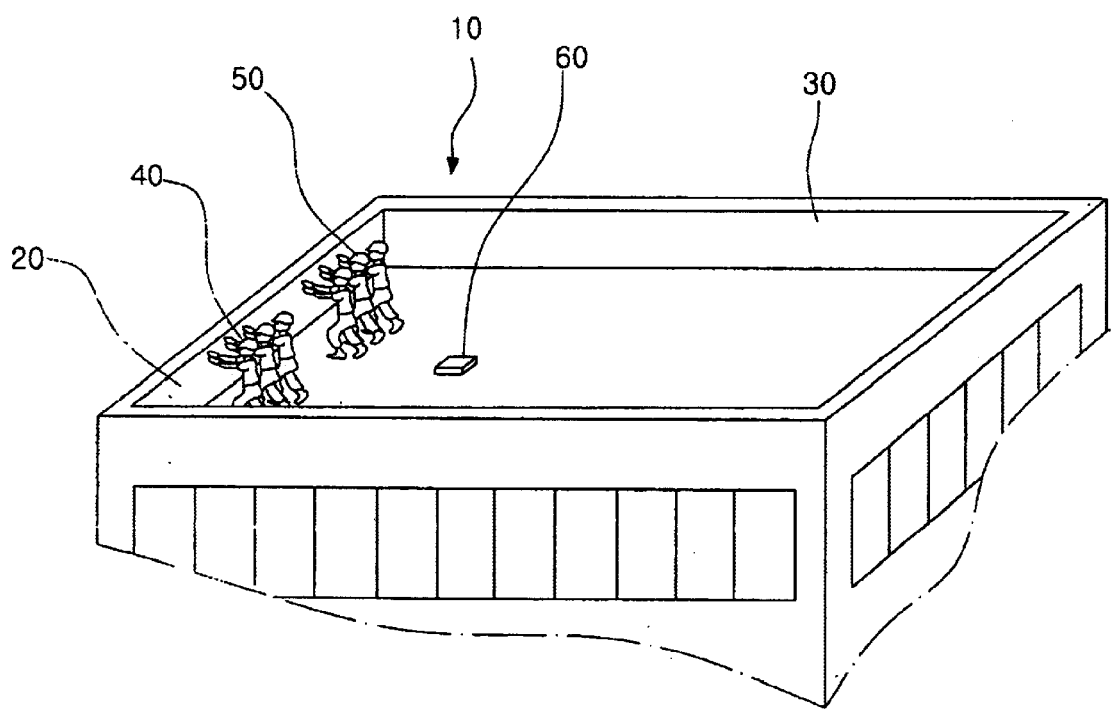
FIG. 1 is a view schematically showing the concept of an alternating human vibration-exciting method according to the present invention.

Now, the present invention is described in detail referring to the drawings.

FIG. 1 is a view illustrating an alternating human vibration-exciting method for a low-rise building. As shown in this figure, this method requires first and second sets of human subjects 40 and 50 for vibration excitation. This vibration excitation is performed for each of wall in short and long direction 20 and 30 respectively. The two sets of human subjects 40 and 50 have similar weights to each other so that vibration excitation forces are uniformly applied to the entire portions of the structure 10. A beat sound generator 60 such as an electronic beat sound generator is used to perform the vibration exciting actions at an accurate frequency.

The electronic beat sound generator 60 is adjusted to have a beat sound frequency equal to the natural vibration frequency of the structure 10 that is obtained via the micro-tremor measurement. In addition, the generator 60 is set to a two-beat node so that each of a pair of beat sounds is generated at a frequency corresponding to half of the natural vibration frequency. The two sets of human subjects 40 and 50 alternately act to exert excitation forces on a portion of the structure such as the walls 20 or 30 several tens of times, while synchronizing their actions to each of the beat sounds. Such a method is called an alternating human vibration-excitation.

Vibrations in the walls in short and long direction 20 and 30 of the structure 10 are detected by a vibration measuring sensor such as an accelerometer, and data on detected vibration waveform is recorded. The vibration measuring sensor responds sensitively to a low vibration amplitude, and therefore after stopping the vibration excitation action to initiate the free vibration, the human subjects must keep their position without any movement until the data recording is completed, so as not to affect the free vibration waveform.

As mentioned above, it is generally difficult to manually and repeatedly apply a sufficient exciting force at a frequency more than 2.5 Hz. However, such an alternating vibration excitation according to the present invention makes it possible to manually apply a sufficient exciting force even at the frequency more than 2.5 Hz, thereby obtaining a desired free vibration waveform.

Figure 4:
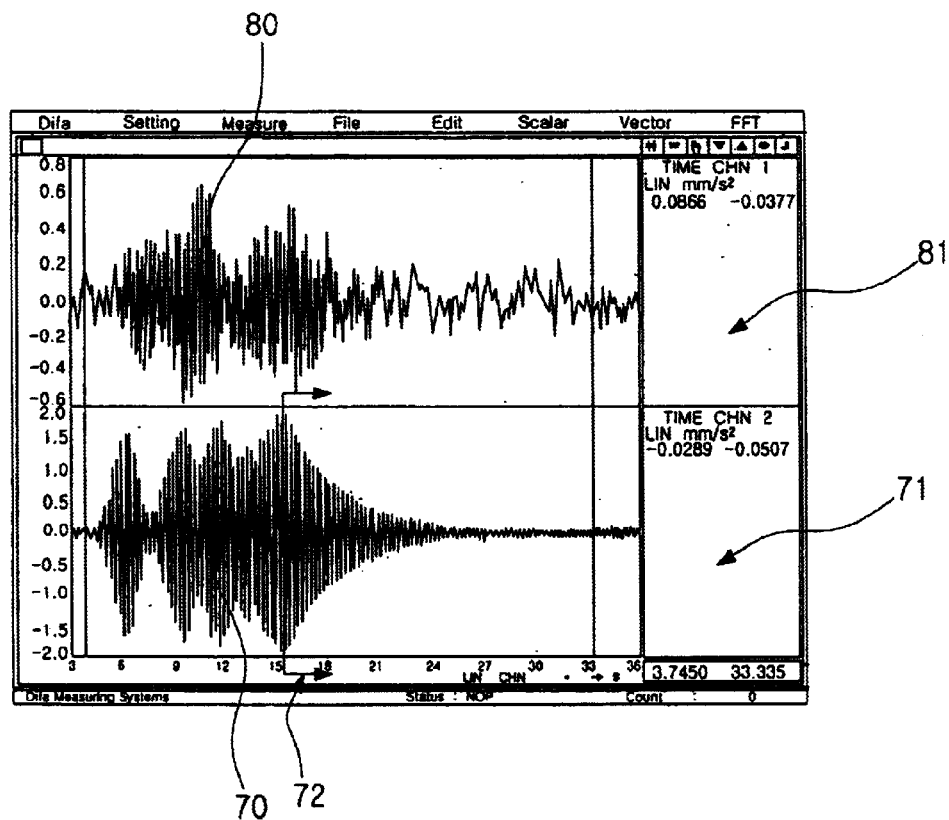
FIG. 4 is a graph showing a free vibration waveform of a real structure that is obtained by the alternating human vibration exciting method according to the present invention.

FIG. 4 shows the result of a human vibration-exciting test performed on the top of the Social Education Center in Seoul National University of Technology, according to the present invention, where an alternating human excitation was performed at a frequency of 2.05 Hz only on a wall in short direction 20 having a natural vibration frequency of 4.1 Hz. FIG. 4 is divided into upper and lower channels 81 and 71 illustrating upper and lower graphs 80 and 70, respectively. The upper and lower graphs 80 and 70 illustrate vibration waveforms measured from walls in long and short direction 30 and 20, respectively. In these graphs, the horizontal axis represents time and the vertical axis represents the value of the measured acceleration of the structure. The damping ratio of the tested structure was estimated by analyzing, based on the logarithmic decrement method, the acceleration-response time-series waveforms measured by the human vibration-exciting method. As mentioned above, this test was performed in such a manner that the human excitation was performed only on the wall in the short direction 20, and thus a free vibration waveform does not appear on the upper graph 80 illustrating the vibration of the wall in the long direction, but on the lower graph 70 illustrating the vibration of the wall in the short direction.

As shown in the graphs, although the wall in short direction 20 has a very high natural vibration frequency of 4.1 Hz, the alternating human vibration excitation having a frequency of 2.05, half of the natural vibration frequency 4.1 Hz, makes it possible to obtain a free vibration waveform having an amplitude several tens of times larger than that of the micro-tremor.

Figure 2:
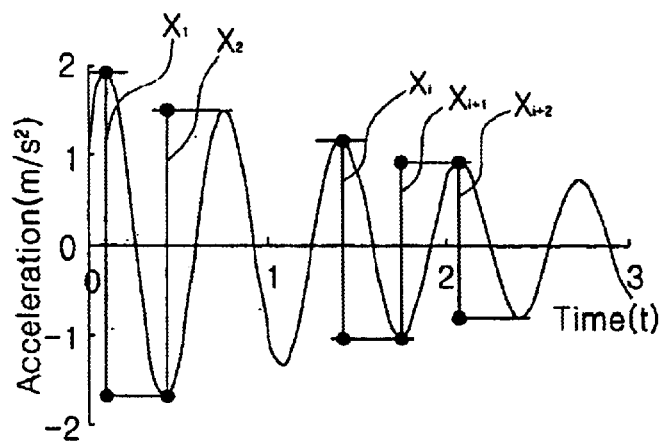
FIG. 2 is a graph illustrating a free vibration waveform and a damping ratio calculation method.
Figure 3:
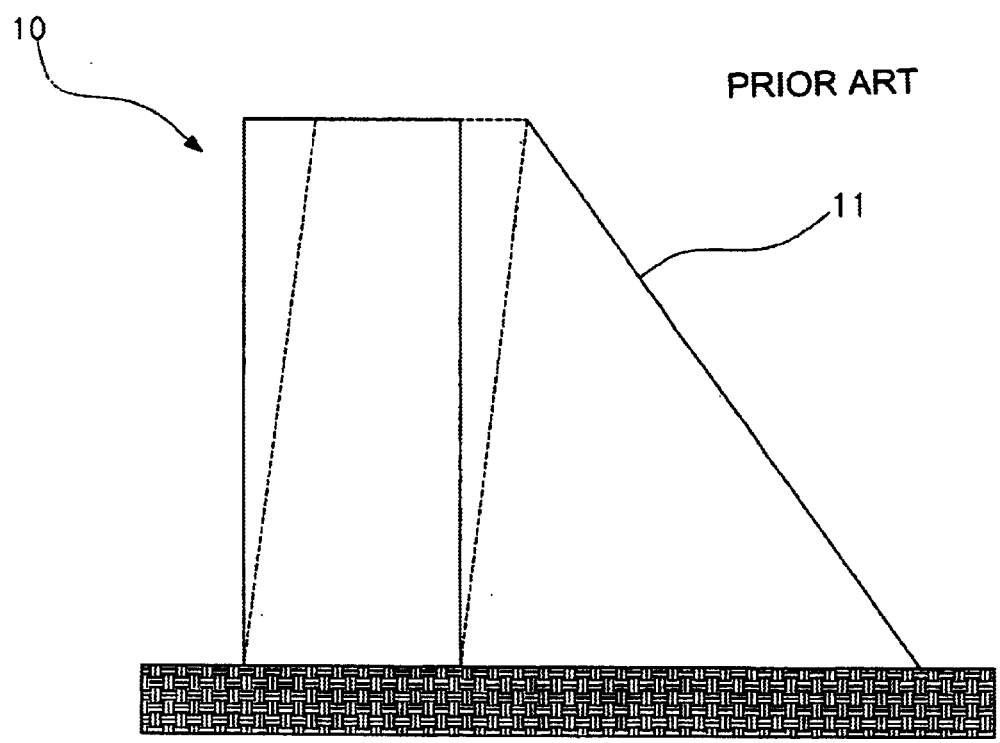
FIG. 3 is a view schematically showing a tensioned steel-wire cutting method, a kind of vibration exciting method of the prior art.

FIG. 5 shows the damping ratio that was estimated based on the damping ratio estimation method illustrated by the graph of FIG. 2, using a free vibration waveform on the right or after the free vibration beginning line 72 of FIG. 4, obtained by the alternating human excitation test.

As apparent from the above description, the present invention has an advantage in that a natural vibration frequency or a damping ratio obtained by analyzing a free vibration waveform that is obtained by such a method, as follows, can be utilized for a vibration-related estimation of the structure. That is, the free vibration waveform is obtained in such a manner that a human vibration excitation is performed for each of walls in short and long direction of a building by separated-positioned first and second sets of human subjects whose weights are similar to each other, and an electronic beat-sound generator is provided to allow the human subjects to apply a vibration exciting force uniformly on the entire portions of the structure, thereby generating a free vibration waveform having an amplitude several tens of times larger than that of the micro-tremor at buildings or civil structures having a natural vibration frequency more than 2.5 Hz, at which frequency it is generally difficult to perform a human vibration excitation.

In addition, the present invention has an advantage in that the inertial force obtained by a movement of the weight of the human subjects is used as means for pushing the structure, with no need to prepare a special machine, thereby making it easy to perform the vibration test even just before the completion of the construction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An alternating human vibration-exciting method for obtaining a free vibration waveform of buildings or civil structures having a natural vibration frequency more than 2.5 Hz, wherein obtaining the free vibration waveform comprises the steps of:

(a) having first and second same-number sets of subjects having weights similar to each other alternately apply exciting forces to a wall on a top of the structure;

(b) having an electronic beat-sound generator adjust to a two-beat mode to repeatedly generate two alternating beat sounds so that the first and second sets of human subjects can apply vibration exciting forces repeatedly at a frequency corresponding to half of the natural vibration frequency of the structure obtained by micro-tremor measurement, while alternately synchronizing their actions to the two alternating beat sounds, respectively; and (c) stopping the vibration exciting action after the structure is brought to a sufficient resonance state, thereby obtaining a free vibration waveform.

* * * * *

UNITED STATES PATENT AND TRADEMARK OFFICE
CERTIFICATE OF CORRECTION

PATENT NO. : 6,757,620 B1
DATED : June 29, 2004
INVENTOR(S) : Yoon et al.

Page 1 of 1

It is certified that error appears in the above-identified patent and that said Letters Patent is hereby corrected as shown below:

<u>Title page,</u>
Item [57], ABSTRACT,
Line 3, replace "2-5Hz." with -- 2.5Hz --.

<u>Column 2,</u>
Line 17, replace "(X1/X1+2)" with -- (Xi/Xi+2) --.
Lines 21 and 26, replace "X1" with -- Xi --.

<u>Column 3,</u>
Line 22, replace "node" with -- mode --.
Line 36, replace "invent ion" with -- invention --.
Line 37, replace "detai led" with -- detailed --.
Line 52, replace "method;" with -- method. --.
Line 64, delete "of".

Signed and Sealed this

Twenty-third Day of August, 2005

JON W. DUDAS
*Director of the United States Patent and Trademark Office*